United States Patent [19]

Sokoler

[11] Patent Number: 6,026,133
[45] Date of Patent: Feb. 15, 2000

[54] METHOD AND APPARATUS FOR SYSTEM CLOCK ADJUSTMENT

[75] Inventor: Izydor Sokoler, Copenhagen K, Denmark

[73] Assignee: Nokia Mobile Phones Limited, Espoo, Finland

[21] Appl. No.: 08/889,361

[22] Filed: Jul. 8, 1997

[30] Foreign Application Priority Data

Jul. 11, 1996 [GB] United Kingdom .................... 9614537

[51] Int. Cl.⁷ ...................................................... H04L 7/00
[52] U.S. Cl. ............................................ 375/365; 375/369
[58] Field of Search .................................... 375/369, 365, 375/368; 370/305, 510, 514, 516

[56] References Cited

U.S. PATENT DOCUMENTS

| | | | |
|---|---|---|---|
| 3,826,869 | 7/1974 | Vax et al. ........................... | 178/69.5 R |
| 4,144,414 | 3/1979 | Nicholas ................................... | 179/15 |
| 5,070,517 | 12/1991 | Köchler et al. ......................... | 375/117 |
| 5,073,973 | 12/1991 | Ylivakeri ................................. | 455/76 |
| 5,124,980 | 6/1992 | Maki ........................................ | 370/77 |
| 5,335,364 | 8/1994 | Heinonen ................................ | 455/76 |
| 5,530,704 | 6/1996 | Gibbons et al. ....................... | 370/94.2 |
| 5,623,522 | 4/1997 | Ito ........................................... | 375/369 |
| 5,649,320 | 7/1997 | Korhonen et al. ................... | 455/196.1 |
| 5,666,366 | 9/1997 | Malek et al. ........................... | 370/505 |
| 5,680,596 | 10/1997 | Iisuka et al. ............................ | 395/559 |

FOREIGN PATENT DOCUMENTS

0338668 A2  10/1989  European Pat. Off. .

OTHER PUBLICATIONS

ETSI DECT (ETR 015, 3/91), Section 3 (Radio Aspects of DECT System) and Section 3.2.2 (Physical Layer), 11 pages.

ETS 300 175–2, 10/92, Sections 4.1–4.4 (Physical Layer) and Section 4.4 ("Physical Packets"), 6 pages.

"Evaluation and Implementation of 2–state Viterbi Equalizers for the Dect System", F. Frederiksen, P.K. Thomsen, Jun. 1994, Sections 2.2.1–2.2.4, 3 pages.

Primary Examiner—Stephen Chin
Assistant Examiner—Mohammad Ghayour
Attorney, Agent, or Firm—Perman & Green, LLP

[57] ABSTRACT

A system clock of a radio telephone is adjusted in relation to an associated transmitter/receiver station system clock by detecting a predetermined part (SYNC word) which occurs periodically in a digital signal. A clock signal having pulses synchronous with the system clock signal of the radio telephone is formed. The clock pulses in the clock signal are counted between the detection of two predetermined parts in the digital signal, and the system clock is corrected in response to the number of pulses between the detection of said two predetermined parts in the digital signal.

21 Claims, 1 Drawing Sheet

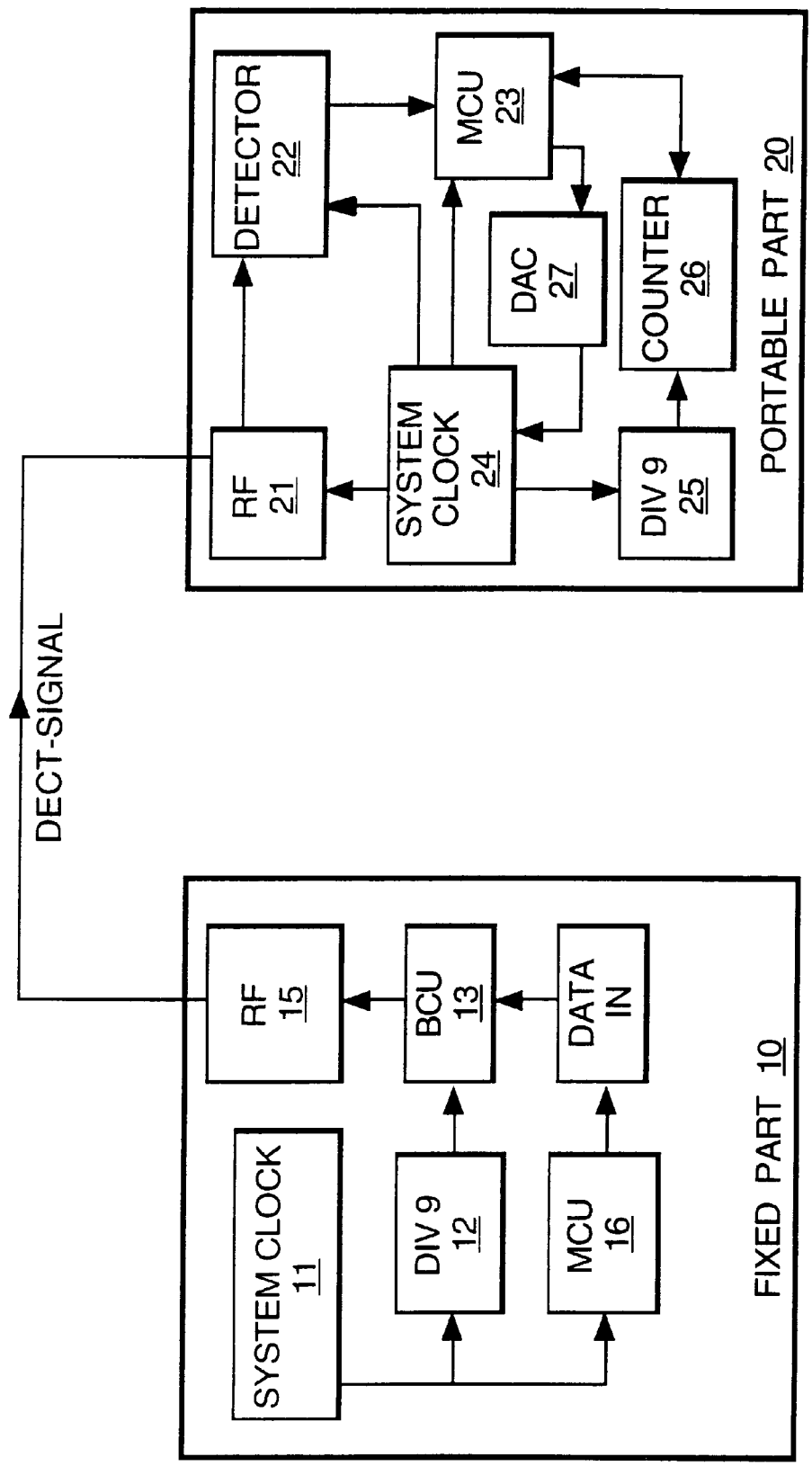

METHOD AND APPARATUS FOR SYSTEM CLOCK ADJUSTMENT

BACKGROUND OF THE INVENTION

The invention concerns a method of adjusting a radio telephone system clock in relation to an associated transmitter/receiver station system clock, a frequency adjustment device to adjust the radio telephone system clock, and a radio telephone having such a frequency adjustment device.

According to the standard determined by ETSI for the European digital cordless telephone system (DECT), a portable telephone in locked idle mode is to resynchronize its timing in relation to its fixed part with at least a predetermined frequency.

A DECT signal is divided into time slots and frames, where a multiframe consists of 16 frames, and each frame consists of 24 slots (TDMA), each having 480 bits. Since the fixed part transmits data at a bit rate of 1.152 Mbits/sec., 184320 data bits will be transmitted during a multiframe. Even the best system clock (XO) will have an inaccuracy corresponding to at least 6–7 bits during such a period.

SUMMARY OF THE INVENTION

A clock signal synchronous with the radio telephone system clock signal is generated, and the pulses in this clock signal are counted between the detecting times of two predetermined parts in the digital signal. The system clock is corrected in response to the number of pulses between the detection of said two predetermined parts of the digital signal. An error signal may be generated, represented by the difference between the number of pulses in the clock signal and the expected number.

The invention provides a frequency adjustment device which permits the system clock of the portable part to be adjusted as needed in relation to the system clock of the fixed part by detecting a predetermined part which occurs periodically in a digital signal.

In the preferred embodiment, the clock frequency of the clock signal will be selected so as to correspond with the data rate, as the expected number of pulses will hereby correspond to the number of bits in the signal between e.g. two SYNC words. When the voltage dependence of the frequency from the voltage-controlled crystal oscillator is known, a correction voltage may be determined directly on the basis of the pulse difference determined by comparing the counted value with the expected value, thereby enabling correction of the system clock of the portable part to the system clock of the fixed part. This provides a type of phase-locked loop, the system clock of the portable part being corrected at discrete moments. The corrections may be made periodically, or the frequency may be determined by the size of the corrections, said frequency being then increased at greater corrections.

The frequency adjustment device of the invention may adjust the frequency of the radio telephone system clock in relation to an associated transmitter/receiver station system clock and comprise means to detect a predetermined part which occurs periodically in a digital signal, a clock device to supply a clock signal synchronous with the system clock signal, a counter adapted to count the clock pulses in the clock signal of the clock device, and a control device to register the status of the counter device when the detecting means detect the predetermined part in the bit sequence, said control device being moreover adapted to correct the system clock in response to the status of the counter in the detection of the predetermined part. Thus, a form of feedback frequency adjustment is introduced in the system.

When the resynchronization device of the invention is used in a DECT telephone, the detecting means may comprise a SYNC word detector, e.g. a correlator, which correlates the digital signal with a predetermined correlation word. However, this will be preceded by a search for a preamble, which is a sequence of alternating bits. The SYNC word, which is a predetermined bit pattern determined by ETSI, follows directly after the preamble.

In a preferred embodiment of the invention, the clock device in the frequency adjustment device comprises a first clock (data clock) which supplies a clock signal at 1152 kHz. The system clock of the telephone supplies a clock signal at 10.368 MHz, and the data clock can therefore be provided on the basis of the system clock by dividing its frequency by 9.

In a preferred embodiment, the clock pulses are counted over a multiframe, which corresponds to 184320 data bits, for which reason the counter wraps around at this value. The counter is reset at the value 32 when detecting the SYNC word in the DECT signal, as the SYNC words ends at bit No. 32 in a time slot.

BRIEF DESCRIPTION OF THE DRAWING

The invention will be explained more fully below, by way of example only, in connection with a preferred embodiment and with reference to the drawing, whose FIGURE schematically shows this embodiment of a frequency adjustment device of the invention for a DECT telephone.

DETAILED DESCRIPTION OF THE INVENTION

In the preferred embodiment of the frequency adjustment device of the invention, it is used in connection with a DECT system having a signal structure as described in the ETSI proposal for standard ETS 300 175. Data are transferred as time-multiplexed data (TDMA) in time slots according to the DECT standard, and a time slot consists of a preamble having sixteen alternating bits, a SYNC word having sixteen bits in a predetermined bit pattern, data bits and a plurality of terminating control bits. A time slot contains 480 bits in all. Twenty-four successive time slots form a frame, and a telephone connection typically has allocated to it two time slots (one for each way) in the frame. Sixteen frames form a multiframe which has a length of 160 ms because of the signalling rate of 1.152 Mbits/s.

A preferred embodiment of a portable DECT telephone of the invention will be explained in connection with the figure. A fixed part 10 comprises a system clock 11 which oscillates at a frequency of 10.368 MHz. This frequency is divided by a factor 9 in a frequency divider 12, and it is then used in a burst controller unit 13 under the control of a central control unit 16 for transmitting data at a bit rate of 1.152 MHz via an RF part 15.

A portable part 20 (the telephone) receives a time-multiplexed DECT signal via an RF circuit 21. The digital signal is passed from the FM detector of the RF circuit 21 to a detecting device 22, which detects the DECT signal preamble and SYNC word consisting of sixteen alternating bits and sixteen bits in a predetermined bit pattern, respectively. This detection may advantageously be performed with two correlations, where the signal in one of them (the clock recovery unit) is compared with a correlation word corresponding to a section of the preamble and in the other with a correlation word corresponding to the SYNC word.

The clock recovery unit itself is discussed in detail in UK Patent Application No. 9602585.3, and a particularly expedient correlation register is discussed in detail in UK Patent Application No. 9602566.3. These two patent applications are hereby incorporated by reference in the present application. When the preamble has been detected, the SYNC word detecting part of the detector 22 begins to search for the SYNC word, and when the correlation degree exceeds a predetermined threshold value, the SYNC word is considered to be detected, This is described in a co-pending application entitled "Method and Apparatus for Resynchronizing Two System Clocks" (UK No. GB9614587.5), which concerns synchronization of the portable part and the fixed part in idle mode, and which was filed on the same day as the present application. This patent application is hereby incorporated by reference in the present application.

A full multiframe is run in the preferred embodiment when the system clock, which is also used as a reference frequency in the frequency synthesis via a phase-lock loop (PLL) needs to be adjusted. A counter 26 counts the clock pulses in a clock signal with a frequency of 1152 kHz. This clock signal is supplied from a frequency divider 25 which divides the system clock signal from the system clock 24 of 10.368 MHz by a factor 9. The leading edge of the pulses in the 1152 kHz clock signal will be synchronous with the leading edges on every ninth pulse in the system clock signal. The signals may hereby be considered to be synchronous, even though the frequencies are really a factor 9 different. The portable part clock generator (and thereby the system clock), which supplies a data signal at the data bit rate, must be switched on during the frequency adjustment. This means that the telephone, although it is in idle mode, cannot utilise a sleep mode function, where the system clock is switched off, during the frequency adjustment.

As the SYNC word is terminated 32 bits after the start of the preamble, which starts a time slot, the counter 26 is set at the value 32 when the SYNC word is detected by the detector 23. The counter 26 then counts upwards, and it wraps around at the value 184320 (corresponding to one multiframe). If the system clocks of the fixed part and the portable part are synchronous, a SYNC word will be detected when the counter 26 reaches the value 32. This will not always be the case, as frequency drift may occur. Therefore, the counter 26 is reset at the value 32 when the SYNC word is detected, and the counter value, directly before resetting, is read and used for calculating the difference between the expected value and the actual value in the microcontroller unit 23. This difference is used as a correction value, and by table look-up the MCU 23 can determine a compensation voltage and tune the system clock 24, which is preferably a voltage-controlled temperature-compensated crystal oscillator, via a digital-to-analog converter 27 (DAC).

The system clock of the portable part will hereby be locked to the system clock of the fixed part. The frequency offset value may hereby be kept within a narrow range, thereby eliminating problems caused by ageing and frequency drift.

The MCU 23 may advantageously have a look-up table in which it can determine the next frequency adjustment time on the basis of the difference. The time for the next frequency adjustment may hereby be postponed if the error is small, or be advanced if the error is great.

What is claimed is:

1. A method of adjusting a radio telephone system clock in relation to an associated transmitter/receiver station system clock of a base station, comprising steps of: generating in the radio telephone a system clock signal and a further clock signal that is synchronous with the system clock signal; repetitively counting clock pulses of said further clock signal between a detection of two predetermined parts that occur periodically in a digital signal received from the base station; and repetitively correcting said system clock in response to a number of clock pulses that are counted between the detection of the two predetermined parts of the digital signal as long as said radio telephone communicates with said base station.

2. A method of adjusting a radio telephone system clock in relation to an associated transmitter/receiver station system clock, comprising detecting a predetermined part which occurs periodically in a digital signal, providing a clock signal which is synchronous with the system clock signal of the radio telephone, counting the clock pulses in the clock signal between the detection of two predetermined parts in the digital signal, and correcting the system clock in response to the number of pulses between the detection of said two predetermined parts in the digital signal, wherein the digital signal is a Digital Cordless Telephone System DECT signal, and wherein the two predetermined parts comprise the signal preamble and synchronization SYNC word occurring in two different time slots.

3. A method of adjusting a radio telephone system clock in relation to an associated transmitter/receiver station system clock, comprising steps of generating in the radio telephone a system clock signal and another clock signal that is synchronous with the system clock signal, repetitively detecting a predetermined part which occurs periodically in a digital signal received from the transmitter/receiver station, counting clock pulses in the clock signal between the detection of two predetermined parts in the digital signal, and repetitively correcting, so long as the radio telephone communicates with the transmitter/receiver station, the system clock in response to a number of clock pulses that are counted between the detection of said two predetermined parts in the digital signal by generating a correction voltage to correct the system clock in response to the number of clock pulses that are counted in relation to a predetermined value.

4. A frequency adjustment device for a radio telephone to adjust the frequency of a radio telephone system clock in relation to an associated transmitter/receiver station system clock, comprising means to detect a predetermined part which occurs periodically in a digital signal, a clock device to supply a clock signal which is synchronous with the system clock signal, a counter device adapted to count the clock pulses in the clock signal of the clock device, and a control device to register the status of the counter device when the detecting means detect the predetermined part in the digital signal, said control device being moreover adapted to repetitively correct, so long as the radio telephone communicates with the transmitter/receiver station, the system clock in response to the status of the counter device at the time of the detection of the predetermined part.

5. A frequency adjustment device according to claim 4, wherein the detecting means comprise a synchronization SYNC word detector to detect the SYNC word in a Digital Cordless Telephone System DECT signal.

6. A frequency adjustment device according to claim 4, wherein the clock device supplies the clock signal by dividing the system clock frequency by means of a frequency divider.

7. A frequency adjustment device according to claim 6, wherein the clock device supplies the clock signal with a frequency of 1152 kHz by dividing the system clock with a frequency of 10.368 MHz by means of a frequency divider which divides the system clock frequency by a factor 9.

8. A frequency adjustment device for a radio telephone to adjust the frequency of a radio telephone system clock in relation to an associated transmitter/receiver station system clock, comprising means to detect a predetermined part which occurs periodically in a digital signal, a clock device to supply a clock signal which is synchronous with the system clock signal, a counter device adapted to count the clock pulses in the clock signal of the clock device, and a control device to register the status of the counter device when the detecting means detect the predetermined part in the digital signal, said control device being moreover adapted to correct the system clock in response to the status of the counter device in the detection of the predetermined part, wherein the digital signal is a Digital Cordless Telephone System DECT signal, and wherein the counter device counts the pulses in the clock signal for a plurality of consecutive frames in the DECT signal.

9. A frequency adjustment device for a radio telephone to adjust the frequency of a radio telephone system clock in relation to an associated transmitter/receiver station system clock, comprising means to detect a predetermined part which occurs periodically in a digital signal, a clock device to supply a clock signal which is synchronous with the system clock signal, a counter device adapted to count the clock pulses in the clock signal of the clock device, and a control device to register the status of the counter device when the detecting means detect the predetermined part in the digital signal, said control device being moreover adapted to correct the system clock in response to the status of the counter device in the detection of the predetermined part, wherein the digital signal is a Digital Cordless Telephone System DECT signal, and wherein the counter device counts the pulses in clock signals for a plurality of consecutive frames that occur during a multiframe in the DECT signal.

10. A frequency adjustment device for a radio telephone to adjust the frequency of a radio telephone system clock in relation to an associated transmitter/receiver station system clock, comprising means to detect a predetermined part which occurs periodically in a digital signal, a clock device to supply a clock signal which is synchronous with the system clock signal, a counter device adapted to count the clock pulses in the clock signal of the clock device, and a control device to register the status of the counter device when the detecting means detect the predetermined part in the digital signal, said control device being moreover adapted to correct the system clock in response to the status of the counter device in the detection of the predetermined part, wherein the control device, when the detecting means detect the predetermined part in the form of a SYNC word, generate an error signal in response to the status of the counter device, said error signal being used for correcting the system clock.

11. A frequency adjustment device according to claim 10, wherein the control device is associated with a digital-to-analog converter to which the error signal is fed, said converter generating an analog control voltage contribution which is fed to the system clock.

12. A radio telephone having a frequency adjustment device to adjust the frequency of a radio telephone system clock in relation to an associated transmitter/receiver station system clock, the frequency adjustment device comprising a detector for detecting at least one predetermined portion which occurs periodically in a digital signal that is received from the transmitter/receiver station, a clock for supplying a clock signal which is synchronous with the system clock signal, a counter for counting the clock pulses in the clock signal of the clock, and a controller for registering the status of the counter when the detector detects the at least one predetermined portion of the digital signal, said controller being operative to repetitively correct the system clock, so long as the radio telephone communicates with the transmitter/receiver station, in response to a status of the counter when the at least one predetermined portion is detected.

13. A radio telephone having a frequency adjustment device to adjust the frequency of a radio telephone system clock in relation to an associated transmitter/receiver station system clock, the frequency adjustment device comprising a detector for detecting at least one predetermined portion which occurs periodically in a digital signal, a clock for supplying a clock signal which is synchronous with the system clock signal, a counter for counting the clock pulses in the clock signal of the clock, and a controller for registering the status of the counter when the detector detects the at least one predetermined portion of the digital signal, said controller operative to correct the system clock in response to a status of the counter when the at least one predetermined portion is detected, wherein the detector comprises a synchronization SYNC word detector for detecting the at least one predetermined portion, and wherein the at least one predetermined portion is comprised of a SYNC word in a Digital Cordless Telephone System DECT signal.

14. A radio telephone according to claim 12, wherein the clock supplies the clock signal by dividing the system clock frequency by a frequency divider.

15. A radio telephone according to claim 14, wherein the clock supplies the clock signal with a frequency of 1152 kHz by dividing the system clock with a frequency of 10.368 MHz by a frequency divider which divides the system clock frequency by a factor 9.

16. A radio telephone having a frequency adjustment device to adjust the frequency of a radio telephone system clock in relation to an associated transmitter/receiver station system clock, the frequency adjustment device comprising a detector for detecting at least one predetermined portion which occurs periodically in a digital signal, a clock for supplying a clock signal which is synchronous with the system clock signal, a counter for counting the clock pulses in the clock signal of the clock, and a controller for registering the status of the counter when the detector detects the at least one predetermined portion of the digital signal, said controller operative to correct the system clock in response to a status of the counter when the at least one predetermined portion is detected, wherein the digital signal is a Digital Cordless Telephone System DECT signal, and wherein the counter counts the pulses in the clock signal for a plurality of consecutive frames in the DECT signal.

17. A radio telephone according to claim 16, wherein the counter counts pulses in clock signals for a plurality of consecutive frames that occur during a multiframe.

18. A radio telephone having a frequency adjustment device to adjust the frequency of a radio telephone system clock in relation to an associated transmitter/receiver station system clock, the frequency adjustment device comprising a detector for detecting at least one predetermined portion which occurs periodically in a digital signal, a clock for supplying a clock signal which is synchronous with the system clock signal, a counter for counting the clock pulses in the clock signal of the clock, and a controller for registering the status of the counter when the detector detects the at least one predetermined portion of the digital signal, said controller operative to correct the system clock in response to a status of the counter when the at least one predetermined portion is detected, wherein the controller, when the detector detects the at least one predetermined portion of the digital signal in the form of a synchronization SYNC word, generates an error signal in response to the status of the counter, said error signal being used for correcting the system clock.

19. A radio telephone according to claim 18, wherein the controller is associated with a digital-to-analog converter to which the error signal is fed, said converter generating an analog control voltage contribution which is fed to the system clock.

20. A method of adjusting a radio telephone system clock in relation to an associated transmitter/receiver station system clock, comprising detecting a predetermined part which occurs periodically in a digital signal, providing a clock signal which is synchronous with the system clock signal of the radio telephone, counting the clock pulses in the clock signal between the detection of two predetermined parts in the digital signal, and correcting the system clock in response to the number of pulses between the detection of said two predetermined parts in the digital signal, wherein a correction voltage is generated to correct the system clock in response to the number of pulses in relation to a predetermined value, wherein the digital signal is a Digital Cordless Telephone System DECT signal, and wherein the two predetermined parts comprise the signal preamble and synchronization SYNC word occurring in two different time slots.

21. A radio telephone for communicating with a network via an associated base station, said radio telephone comprising:

means for detecting a predetermined part which occurs periodically in data bursts in a digital signal received from said associated base station;

means for generating a system clock signal for said radio telephone;

means for generating a further clock signal which is synchronous with said system clock signal;

a counter for counting clock pulses in said further clock signal; and a control device for registering a status of said counter when said detecting means detects the predetermined part in the digital signal;

said control device correcting said system clock signal in response to the registered status of said counter; and said control device controlling said counter to repeat counting the clock pulses and to then repeat correcting the system clock signal accordingly for as long as said radio telephone communicates with said base station.

* * * * *